L. D. GILBERT, P. S. TAYLOR, J. G. DEAN AND L. E. ELDER.
APPARATUS FOR COLLECTING AND ISOLATING SOLUBLE SALTS FROM FLUE GASES.
APPLICATION FILED JUNE 25, 1917.
1,324,737.
Patented Dec. 9, 1919.
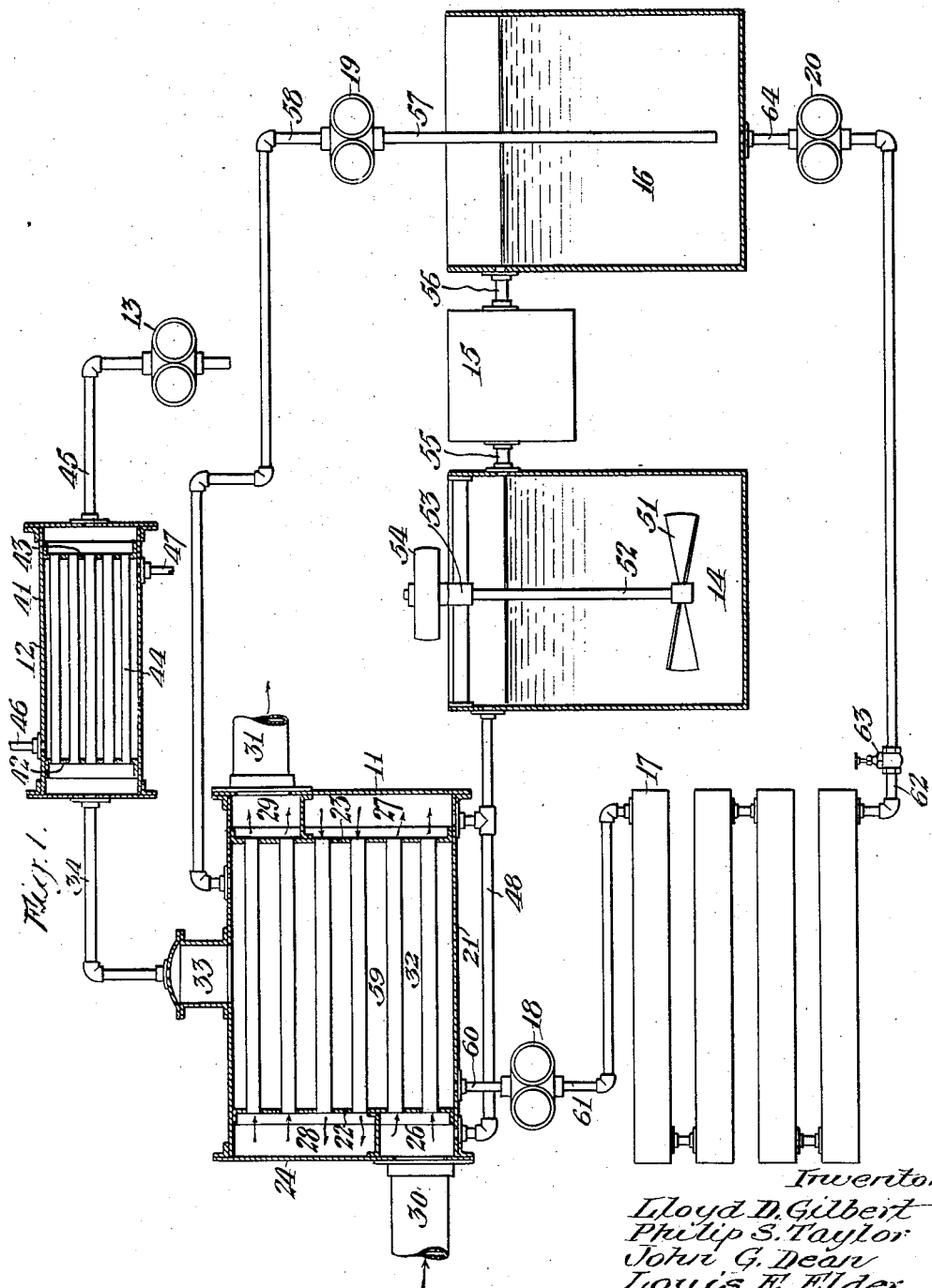

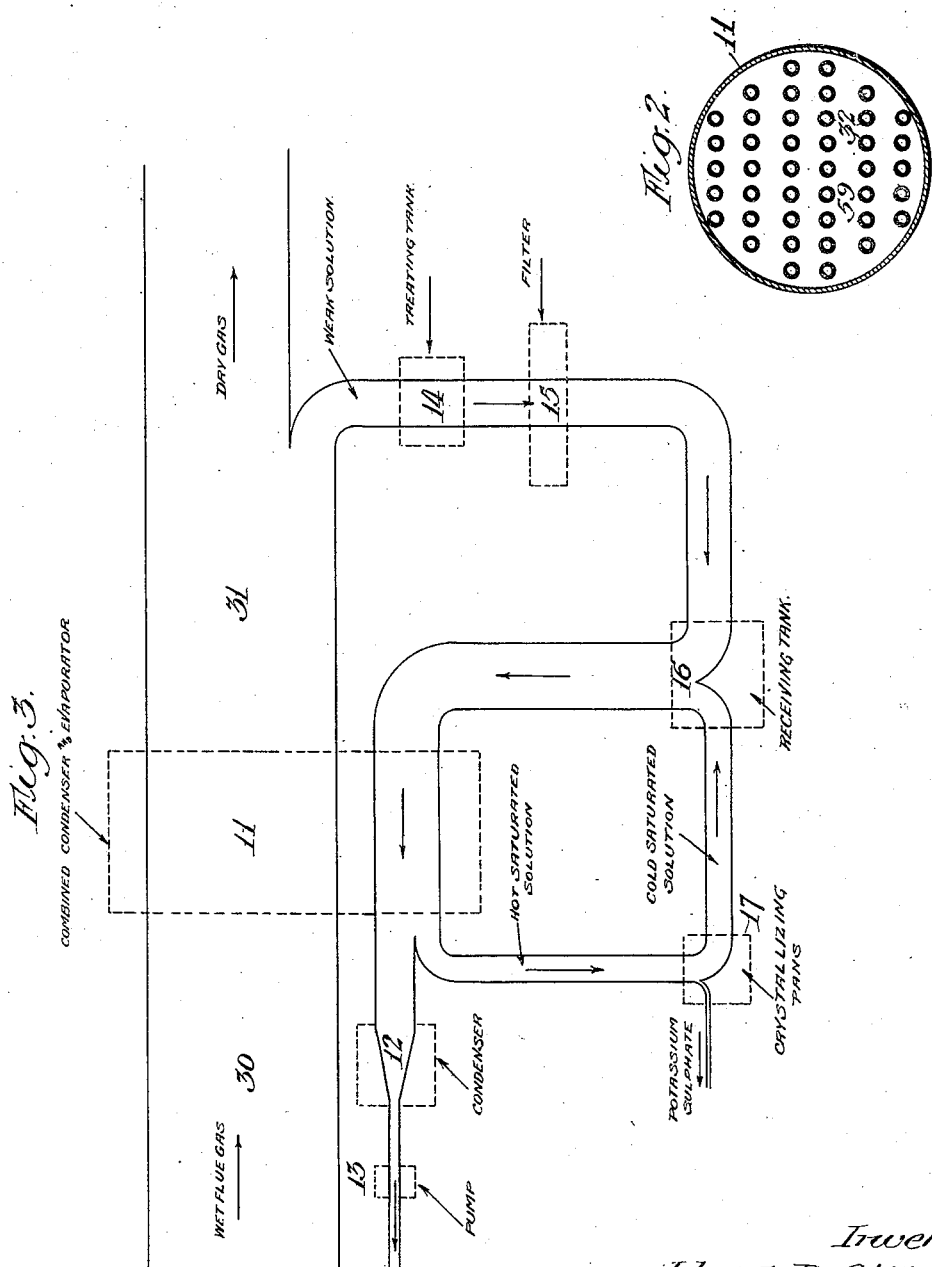

UNITED STATES PATENT OFFICE.

LLOYD D. GILBERT, PHILIP S. TAYLOR, JOHN G. DEAN, AND LOUIS E. ELDER, OF VICTORVILLE, CALIFORNIA.

APPARATUS FOR COLLECTING AND ISOLATING SOLUBLE SALTS FROM FLUE-GASES.

1,324,737.      Specification of Letters Patent.      Patented Dec. 9, 1919.

Application filed June 25, 1917. Serial No. 176,886.

*To all whom it may concern:*

Be it known that we, LLOYD D. GILBERT, PHILIP S. TAYLOR, JOHN G. DEAN, and LOUIS E. ELDER, all citizens of the United States, residing at Victorville, in the county of San Bernardino and State of California, have invented a new and useful Apparatus for Collecting and Isolating Soluble Salts from Flue-Gases, of which the following is a specification.

Our invention relates to the art of collecting and reclaiming soluble salts from flue gases. It has a particular application in the collection of soluble potassium salts from the flue gases of Portland cement kilns.

The principal object of the invention is to provide an apparatus by which such soluble salts can be collected with a minimum of expense and with a maximum of efficiency.

The apparatus is, however, applicable to types of apparatus other than Portland cement kilns and can be used for the collection of salts other than those of potassium. For convenience in description, we will, however, describe the apparatus as applied to Portland cement kilns, and as recovering potassium salts from the flue gases of these kilns.

While there are various soluble salts found in flue gases, it is our particular aim to recover potassium sulfate, and we will further limit our description to such a process.

Referring to the drawing, which is highly diagrammatic:

Figure 1 is a view, partly in section, showing the apparatus employed in our invention.

Fig. 2 is a section on a plane taken vertically through the condenser and evaporator.

Fig. 3 is a diagram showing the operation of the apparatus.

The apparatus employed in this invention comprises a combined condenser and evaporator 11, a condenser 12, a vacuum pump 13, a treating tank 14, a filter 15, a receiving tank 16, and crystallizing pans 17. Pumps 18, 19 and 20 may also be employed. The condenser 11 consists of a shell 21 having headers 22 and 23 intermediate of the ends. Suitable partitions divide the space between the heads 22 and 23 and the ends of the shell 21 into a receiving chamber 26, a primary intermediate chamber 27, a secondary intermediate chamber 28, and a flue chamber 29. An intake flue 30 connects to the chamber 26, and an outlet flue 31 connects the flue chamber 29 with a suitable stack. Tubes 32 connect the chambers 26, 27, 28 and 29 together, as shown in the drawing, being fastened in pressure tight relationship in the headers 22 and 23. A dome 33 is provided in the top of the shell to which the condenser 12 is connected through a pipe 34. The condenser 12 consists of a shell 41 having headers 42 and 43 therein, between which tubes 44 are connected. The pipe 34 delivers vapor to the space between the end of the shell 41 and the header 42, this vapor passing through the tubes 44 to the space between the header 43 and the end of the shell 41, the vacuum pump 13 being connected to this space through a pipe 45. Water is supplied to the space between the headers 42 and 43 by means of a water pipe 46, being withdrawn through a pipe 47. The condenser 12 may be of any desired form, that described above being merely a convenient one. The chambers 26 and 27 are connected together through a pipe 48 which discharges into the treating tank 14. This tank may be of any convenient form or size and may be provided with an agitating paddle 51 carried on a shaft 52 which is supported in a bearing 53, the shaft 52 being driven by a pulley 54 from any convenient source of power not shown. The tank 14 discharges into the filter 15 through a pipe 55, the filter being of any convenient form and discharging into the receiving tank 16 through a pipe 56. Liquid is taken from the tank 16 by the pump 19 through a pipe 57, and is discharged through a pipe 58 into an evaporating space 59 which is located between the headers 22 and 23 inside the shell 21, the dome 33 being in open communication with this evaporating space 59. The pump 18 is connected through a pipe 60 with the bottom of the evaporating space 59 and discharges through a pipe 61 into the crystallizing pan 17 which may be of any convenient shape or size. Liquid is taken from the crystallizing pan 17 through a pipe 62 provided with a valve 63 by the pump 20 which discharges through a pipe 64 into the bottom of the receiving tank 16.

The method of operation is as follows:

The heated flue gases from flue 30 pass successively through the chambers 26, 27, 28 and 29 through the tubes 32, being delivered from the chamber 29 to the flue 31. These gases, in the case of a wet kiln, contain large amounts of water vapor, and in the case of a dry kiln this water vapor is injected into the gases before they enter the flue 30. Passing through the tubes 32, the water vapor is condensed, giving up its latent heat of vaporization to the liquid in the evaporating chamber 59. The condensed liquid is collected in the pipe 48 and delivered to the treating tank 14.

In the normal operation of cement kilns, considerable quantities of potassium sulfate are often formed. This potassium sulfate is valuable, and with a certain amount of potassium carbonate is found in solution in the liquid passing through the pipe 48. If it is more desirable to handle only one of these salts as a final product, and if the potassium sulfate can be more readily handled, we can add gypsum to the tank 14 for the purpose of changing the potassium carbonate to a potassium sulfate. To eccelerate the reaction we prefer to agitate by the agitating paddle 51, or other suitable means. The liquid from the tank 14 is passed through the filter 15 in which solid matter is removed, the filtered solution passing into the receiving tank 16. This filtered solution is taken from the receiving tank 16 by the pump 19 and forced into the evaporating chamber 59. In some cases where a sufficiently high vacuum is maintained in the evaporating chamber 59, pump 19 may be omitted.

For the purpose of promoting evaporation and assisting condensation, a considerable vacuum is maintained in the evaporating chamber 59, this vacuum being maintained by the vacuum pump 13 and the condenser 12. The temperature of the flue gases in the tubes 32 is such that a rapid evaporation is produced in the chamber 59, with a simultaneous condensation inside the tubes 32. In other words, the boiling point of the water vapor at or near atmospheric pressures inside the tubes 32 is considerably higher than the boiling point of the liquid under vacuum in the evaporating chamber 59. As a consequence, water vapor in large quantities is removed from the dome 33 through the pipe 34, this water vapor being discharged as water or vapor from the discharge of the vacuum pump 13. After the apparatus has been in operation for a short time, the solution of potassium sulfate in the evaporating chamber 59 is at or near saturation, and is at a boiling point somewhat lower than the boiling point of water at atmospheric pressure, but correspondingly higher than the normal temperatures of the air surrounding the apparatus. This hot saturated solution is withdrawn from the evaporating chamber 59 by the pump 18 and is discharged into the crystallizing pan 17 in which it is cooled by air or water coils, or any other convenient means. As the saturated solution cools, the potassium sulfate is thrown down in the crystallizing pans 17. The pump 20 continuously withdraws from the last of the crystallizing pans 17 a saturated solution of potassium sulfate at a low temperature. This saturated solution may be returned directly to the evaporating space 59, or it may be delivered into the receiving tank 16. In either case the potassium sulfate carried therein is eventually redelivered to the evaporating space 59.

The method of operation is well illustrated in Fig. 3 in which the courses of the different materials are plainly shown.

We claim as our invention:—

1. An apparatus for recovering soluble salts carried in suspension in superheated water vapor, which comprises walls forming an evaporating chamber; walls forming a condensing chamber; a wall, through which heat can readily be transferred, separating said evaporating chamber from said condensing chamber; means for passing the superheated water vapor with its suspended particles into said condensing chamber; means for collecting the condensates from said condensing chamber; a filter; means for passing said condensates through said filter into said evaporating chamber; and means for maintaining a partial vacuum on said evaporating chamber.

2. In combination with the apparatus described in claim 1, means for withdrawing a portion of the condensates from said evaporating chamber; means for cooling the portion so withdrawn to induce crystallization of the soluble salts; and means for returning to the evaporating chamber the portion withdrawn with any uncrystallized salts that may be carried therein.

3. An apparatus for withdrawing water from a mixture of water vapor and certain finely divided soluble and insoluble materials which comprises a condensing chamber in which said water vapor is condensed; means for withdrawing the mixture of condensed water and soluble and insoluble materials from said condensing chamber; means for separating the insoluble material from said mixture; a vaporizing chamber so located with relation to said condensing chamber that a liquid carried in said vaporizing chamber is heated by the water vapor in said condensing chamber and cools said vapor; means for introducing the mixture after it has been freed from said insoluble matter into said vaporizing chamber, and means for maintaining a partial vacuum on said vaporizing chamber.

4. A combination as in claim 3 which also comprises a series of crystallizing pans, means for passing liquid from said vaporizing chamber into said pans, and means for mixing the liquid from said pans with the liquid delivered from said condensing chamber.

In testimony whereof, we have hereunto set our hands at Victorville, California, this 19th day of June, 1917.

LLOYD D. GILBERT.
PHILIP S. TAYLOR.
JOHN G. DEAN.
LOUIS E. ELDER.